United States Patent
Maytal (10) Patent No.: US 9,743,250 B2
(45) Date of Patent: Aug. 22, 2017

(54) DETERMINATION OF A LOCATION OF A COMMUNICATION DEVICE

(71) Applicant: EMPIRE TECHNOLOGY DEVELOPMENT LLC, Wilmington, DE (US)

(72) Inventor: Benjamin Maytal, Mevassret (IL)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 569 days.

(21) Appl. No.: 14/343,653

(22) PCT Filed: Oct. 28, 2013

(86) PCT No.: PCT/US2013/067082
§ 371 (c)(1),
(2) Date: Mar. 7, 2014

(87) PCT Pub. No.: WO2015/065317
PCT Pub. Date: May 7, 2015

(65) Prior Publication Data
US 2016/0286359 A1    Sep. 29, 2016

(51) Int. Cl.
*H04W 24/00* (2009.01)
*H04W 4/02* (2009.01)
(Continued)

(52) U.S. Cl.
CPC ............ *H04W 4/028* (2013.01); *H04W 4/02* (2013.01); *H04W 64/00* (2013.01); *H04W 88/08* (2013.01)

(58) Field of Classification Search
CPC ...... H04W 4/028; H04W 64/00; H04W 88/08
(Continued)

(56) References Cited

U.S. PATENT DOCUMENTS 5,952,969 A * 9/1999 Hagerman .............. G01S 5/14
                                                      342/457
7,027,801 B1    4/2006 Hall et al.
(Continued)

FOREIGN PATENT DOCUMENTS

CN    1411289 A    4/2003
EP    1301057 A1   9/2003
(Continued)

OTHER PUBLICATIONS

"Mobile phone tracking," Wikipedia, accessed at en.wikipedia.org/wiki/Mobile_phone_tracking, last modified Aug. 16, 2012, downloaded Aug. 22, 2012, pp. 1-5.
(Continued)

*Primary Examiner* — Marceau Milord
(74) *Attorney, Agent, or Firm* — Moritt Hock & Hamroff LLP; Steven S. Rubin, Esq.

(57) ABSTRACT

Technologies are generally described for methods and systems effective to determine a location of a communication device. In some examples, a method may include generating a request for a response from the communication device. The method may also include broadcasting the request over a cellular network. The method may also include receiving the response from the communication device at three or more antennas. The method may also include determining respective signal strengths of the response. The method may also include determining a location of the communication device based on the respective signal strengths. The method may also include analyzing a memory based on the location of the device to identify content. The method may also include sending the content to the communication device.

18 Claims, 6 Drawing Sheets

(51) Int. Cl.
*H04W 64/00* (2009.01)
*H04W 88/08* (2009.01)

(58) Field of Classification Search
USPC ............... 455/456.1, 450, 522, 456.2, 67.13
See application file for complete search history.

(56) References Cited

U.S. PATENT DOCUMENTS

| | | | |
|---|---|---|---|
| 7,308,356 | B2 | 12/2007 | Melaku et al. |
| 7,899,006 | B2* | 3/2011 | Boyd ............... G01S 5/021 370/328 |
| 8,311,557 | B2 | 11/2012 | Annamalai |
| 8,326,324 | B2 | 12/2012 | Wu et al. |
| 2003/0064733 | A1 | 4/2003 | Okanoue et al. |
| 2004/0252051 | A1 | 12/2004 | Johnson |
| 2007/0192182 | A1 | 8/2007 | Monaco et al. |
| 2008/0004951 | A1 | 1/2008 | Huang et al. |
| 2008/0015942 | A1 | 1/2008 | Harper et al. |
| 2008/0113672 | A1 | 5/2008 | Karr et al. |
| 2008/0287142 | A1 | 11/2008 | Keighran |
| 2009/0306893 | A1 | 12/2009 | Lilley |
| 2010/0271263 | A1* | 10/2010 | Moshfeghi ............ G01S 5/0263 342/378 |
| 2011/0081910 | A1 | 4/2011 | Birle |
| 2012/0089492 | A1 | 4/2012 | Scalisi et al. |
| 2012/0281565 | A1* | 11/2012 | Sauer ................. H04W 64/00 370/252 |
| 2012/0316963 | A1 | 12/2012 | Moshfeghi |
| 2012/0316966 | A1 | 12/2012 | Guo et al. |
| 2013/0115969 | A1 | 5/2013 | Holmes et al. |
| 2016/0080963 | A1* | 3/2016 | Marinier et al. ...... H04L 5/0053 370/252 |
| 2016/0142898 | A1* | 5/2016 | Poitau et al. ..... H04W 72/0413 370/329 |

FOREIGN PATENT DOCUMENTS

| | | |
|---|---|---|
| JP | 2002259253 A | 9/2002 |
| JP | 2003116164 A | 4/2003 |
| JP | 2005086579 A | 3/2005 |
| JP | 2005217689 A | 8/2005 |
| KR | 20120104669 A | 9/2012 |
| WO | 2012106075 A1 | 8/2012 |

OTHER PUBLICATIONS

Arnold, J., "Tips and Tools for Location-Based Marketing," Entrepreneur, accessed at http://web.archive.org/web/20131009013010/http://www.entrepreneur.com/article/206930, Jun. 9, 2010, pp. 1-5.

Shen, A., "Update: US Malls Cancel Cell-Phone Tracking After Pressure From Chuck Schumer," accessed at articles.businessinsider.com/2011-11-29/news/30453518_1_malls-tracking-cell, Nov. 29, 2011, pp. 1-2.

International Search Report with Written Opinion for International Application No. PCTUS2013067082 mailed on Jan. 24, 2014, 12 pages.

* cited by examiner

DETERMINATION OF A LOCATION OF A COMMUNICATION DEVICE

CROSS REFERENCE TO RELATED APPLICATION

This application is a U.S. National Stage filing under 35 U.S.C. §371 of International Application No. PCT/US13/67082 filed on Oct. 28, 2013, the entirety of which is hereby incorporated by reference.

BACKGROUND

Unless otherwise indicated herein, the materials described in this section are not prior art to the claims in this application and are not admitted to be prior art by inclusion in this section.

A structure such as a building may be made of materials that may impede transmission of signals into and/or out of the structure. Devices such as base stations may be deployed inside the structure to convey signals to networks outside of the structure. Antennas may also be deployed inside the structure to convey signals to different devices inside of the structure over internal lines, such as fiber optics lines.

SUMMARY

In some examples, methods for determining a location of a communication device are generally described. The methods may include, by a base station, generating a request for a response from the communication device. The methods may also include broadcasting the request over a cellular network. The methods may also include receiving the response from the communication device at three or more antennas. The methods may also include determining respective signal strengths of the response at the three or more antennas. The methods may also include determining a location of the communication device based on the respective signal strengths.

In some examples, base stations configured to determine a location of a communication device are generally described. The base station may include a processor and a memory configured to be in communication with the processor. The processor may be effective to generate a request for a response from the communication device. The processor may also be effective to broadcast the request over a cellular network. The processor may also be effective to receive the response from the communication device. The processor may also be effective to determine respective signal strengths of the response at three or more antennas. The processor may be effective to determine a location of the communication device based on the signal strength.

In some examples, systems effective to determine a location of a communication device are generally described. The systems may include a processor; and one or more antennas inside of a structure. Each antenna may be configured to be in communication with the processor. A memory may be configured to be in communication with the processor. The processor may be effective to generate a request for a response from the communication device. The processor may also be effective to broadcast the request for the identification over a cellular network. The processor may also be effective to receive the response from the communication device at three or more antennas. The processor may also be effective to determine respective signal strengths of the response at the three or more antennas. The processor may also be effective to determine a location of the communication device inside of the structure based on the respective signal strengths.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to determination of a location of a communication device.

Briefly stated, technologies are generally described for methods and systems effective to determine a location of a communication device. In some examples, a method may include generating a request for a response from the communication device. The method may also include broadcasting the request over a cellular network. The method may also include receiving the response from the communication device at three or more antennas. The method may also include determining respective signal strengths of the response. The method may also include determining a location of the communication device based on the respective signal strengths. The method may also include analyzing a memory based on the location of the device to identify content. The method may also include sending the content to the communication device.

Figure 1:
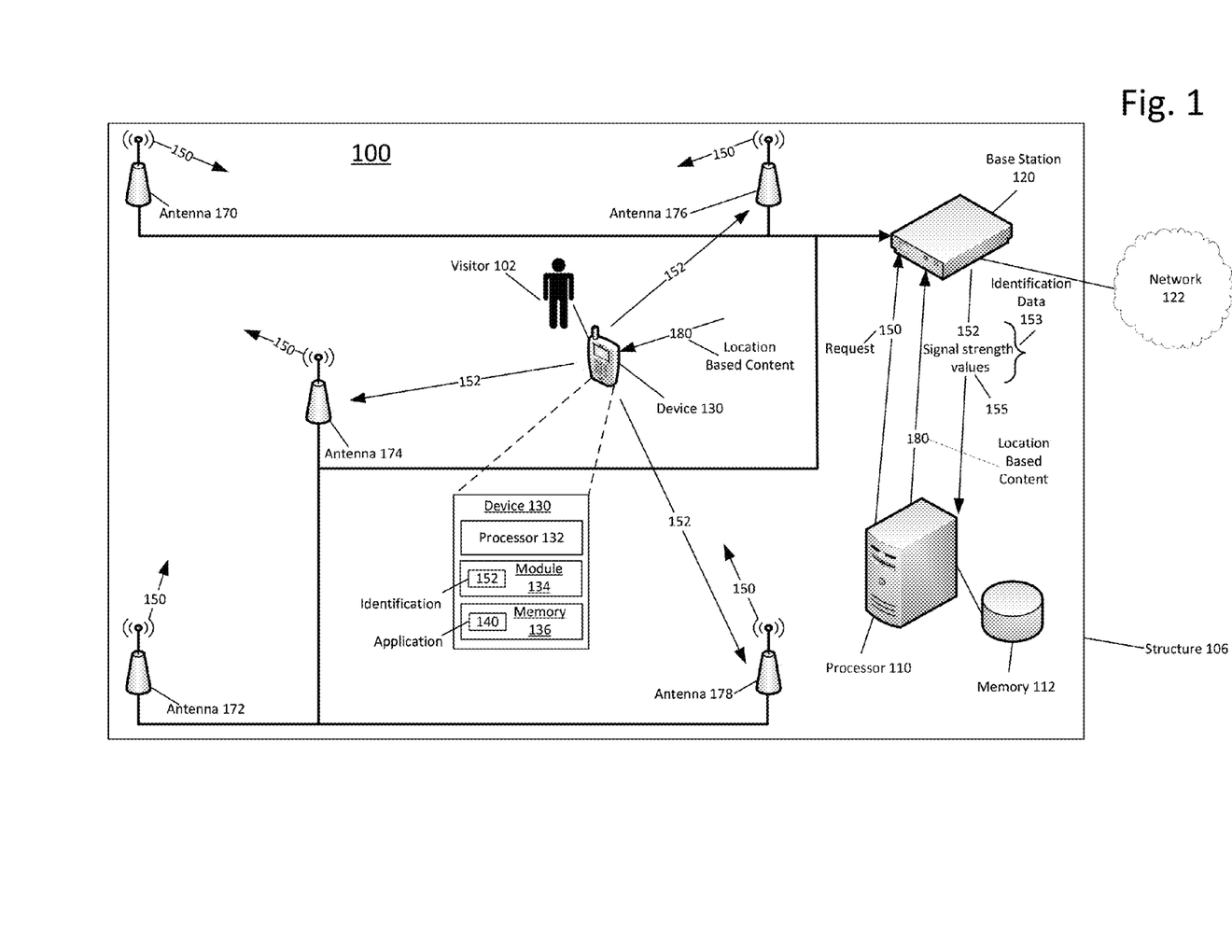
FIG. 1 illustrates an example system that can be utilized to implement determination of a location of a communication device.

FIG. 1 illustrates an example system 100 that can be utilized to implement determination of a location of a communication device, arranged in accordance with at least some embodiments described herein. As depicted, system 100 may include a processor 110, a memory 112, a base station 120, and/or one or more antennas 170, 172, 174, 176, 178 configured to be in communication with one another. Base station 120 and processor 110 may be in one or more housings. System 100 may be implemented in a structure 106 such as a building, a shopping mall, a museum, etc. Structure 106 may be constructed from materials that may impede transmission of particular type of signals, such as satellite signals, into and/or out of structure 106. Structure 106 may include a multiple number of facilities such as offices and/or vendors. In some examples, system 100 may include more than one base station. As discussed in more detail below, system 100 may be implemented to determine a location of a communication device, such as a mobile communication device (sometimes just "device" herein) 130, located in structure 106.

Antennas 170, 172, 174, 176, 178 may each be configured to communicate within respective coverage areas and may be located inside structure 106. A combination of coverage areas of antennas 170, 172, 174, 176, 178 may define a coverage area of a distributed antenna system. Processor 110, memory 112, and/or base station 120 may be located inside or outside of structure 106. Processor 110 may be configured to be in communication with memory 112 and/or base station 120. Base station 120 may be configured to be in communication with antennas 170, 172, 174, 176, 178 such as by wires, Ethernet cable or fiber optic cable.

Processor 110 may determine a location of mobile communication device 130. In an example, processor 110 may be configured to generate a request 150. In some examples, processor 110 may be configured to generate request 150 periodically, such as every one minute, or at any other timing. Request 150 may include request for a response such as an identification 152, which may involve issuing the device IMSI (international mobile subscriber identity) of device 130. Request 150 may involve any other network activity which will cause the particular device to generate a response. Processor 110 may also be configured to receive identification 152 from base station 120. Processor 110 may determine a location of device 130 based on a combination of signal strength values of identification 152 received at respective antennas from device 130 as is described below. In some examples, signal strength values may correspond to a measurement of power of received signals at antennas, which may be relative to the distance from the device to respective antennas. Based on received signal strengths from three antennas, the processor 110 can determine the location of device 130. Memory 112 may be configured to store protocols and/or data relating to system 100.

Base station 120 may be configured to receive request 150 from processor 110 and to broadcast request 150 inside structure 106 over a cellular network through one or more antennas 170, 172, 174, 176, 178. In some examples, base station 120 may be configured to convey an instruction from processor 110 to broadcast request 150. Base station 120 may be further configured to receive responses such as identification 152 from one or more antennas 170, 172, 174, 176, 178, such as through an Ethernet cable, in response to request 150. Base station 120 may be configured to determine signal strength values of responses or identification 152 received at respective antennas 170, 172, 174, 176, 178. In some examples, base station 120 may include a wireless network card configured to determine signal strength values for each identification 152 received at respective antennas 170, 172, 174, 176, 178. For example, if base station 120 receives identification 152 from three antennas 174, 176, 178, base station 120 may determine signal strength values associated with identification 152 at each antenna. Each signal strength value may be based on a distance and/or obstruction between device 130 and a respective antenna.

In an example, base station 120 may generate identification data 153 that includes identification 152 and one or more signal strength values 155. Each signal strength value 155 may be associated with a respective antenna. Base station 120 may send identification data 153 to processor 110. In some examples, base station 120 may be a picocell base station configured to be in communication with a network 122 such as a cellular network. In some examples, base station 120 may be configured to convey communication packets between device 130 and cellular network 122 when device 130 is inside structure 106.

A visitor 102 in structure 106 may use device 130. Device 130 may be a communication device such as a cellular phone. Device 130 may include a processor 132, a module 134, and/or a memory 136. Module 134 may be a subscriber identity module (SIM) and may be effective to store identification 152. Identification 152 may be an international mobile subscriber identity (IMSI) and may be effective to identify device 130. Memory 136 may be configured to store an application 140. An activation of application 140 on device 130 may register device 130 with base station 120. In some examples, device 130 may register with base station 120 upon entering structure 106 such as through an attempt to communicate with network 122. Identification 152 may include data effective to indicate that device 130 is subscribed to cellular network 122. In an example, a personal identifier and device IMSI may be registered in memory 112 such as in a mall database.

In an example, base station 120 may broadcast request 150 over a cellular network through antennas 170, 172, 174, 176, 178. Device 130 may receive request 150 when device 130 is inside structure 106. Device 130 may broadcast identification 152 to base station 120 in response to receiving request 150. Antennas 174, 176, 178 may each receive identification 152 at a respective signal strength value associated with identification 152. Base station 120 may receive identification 152 from each antenna 174, 176, 178 along with respective signal strength values 155. When application 140 is activated on device 130, base station 120 may generate identification data 153 that includes identification 152 and signal strength values 155 and may send identification data 153 to processor 110. Processor 110 may receive identification data 153 and may determine a location of device 130 based on a combination of signal strength values 155 in identification data 153 from multiple antennas. Processor 110 may identify location based content 180 in memory 112 based on the location of device 130 and/or one or more tables stored in memory 112 as discussed below. Processor 110 may send location based content 180 to device 130 through base station 120 and/or antennas 170, 172, 174, 176, 178. Device 130 may output location based content 180 and visitor 102 may view location based content 180 using device 130.

Figure 2:
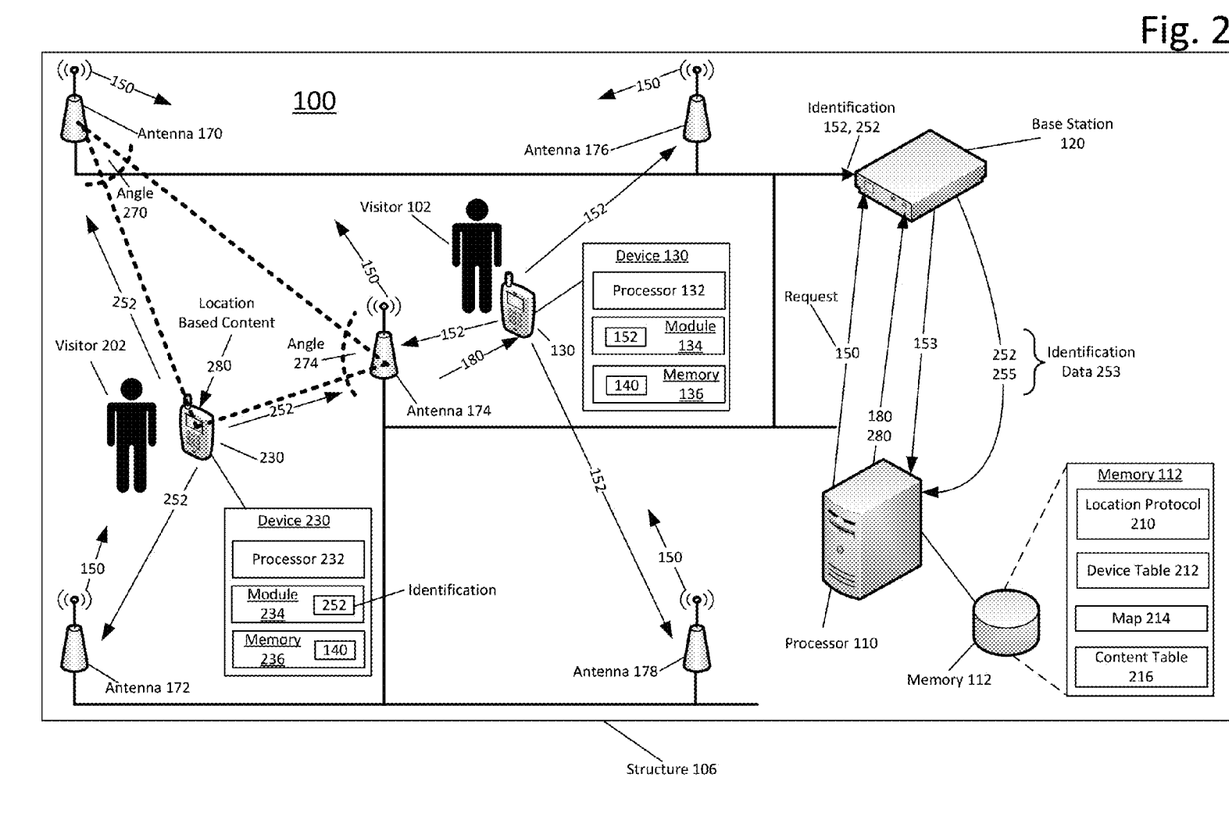
FIG. 2 illustrates the example system of FIG. 1 with additional detail relating to determination of a location of a communication device.

FIG. 2 illustrates system 100 of FIG. 1 with additional detail relating to determination of a location of a communication device, arranged in accordance with at least some embodiments described here. FIG. 2 is substantially similar to system 100 of FIG. 1, with additional details. Those components in FIG. 2 that are labeled identically to components of FIG. 1 will not be described again for the purposes of clarity.

Another visitor 202 may move a mobile communication device (sometimes just "device" herein) 230 inside of structure 106. Device 230 may include a processor 232, a module 234, and/or a memory 236. Module 234 may be a subscriber identity module (SIM) and may be effective to store identification 252. Identification 252 may be an international mobile subscriber identity (IMSI) and may be effective to identify device 230. Identification 252 may include data effective to indicate that device 230 is subscribed to a cellular network. In some examples, device 230 may register with base station 120 upon entering structure 106. Processor 232 may be configured to facilitate receipt of request 150 at device 230 when device 230 is inside structure 106. Device 230 may be configured to receive location based content 280 identified by processor 110. Processor 232 may be further configured to output location based content 280 to a display of device 230.

Memory 112 may include a location protocol 210, a device table 212, a map 214, and/or a content table 216. Location protocol 210 may include logic to facilitate combination of signal strength values that correspond to identification 152 and/or identification 252. In an example, location protocol 210 may include logic, such as triangulation, trilateration, and/or multilateration logic, to determine a location of device 130 and/or device 230.

In an example where location protocol 210 includes triangulation logic, processor 110 may use signal strength values 155 to determine a triangle formed by device 130 and more than one antenna such as antenna 170 and antenna 174. Processor 110 may identify angles 270, 274 in response to formation of the triangle. Processor 110 may determine a location of device 130 based on angles 270, 274. Processor 110 may determine a location of device 230 using similar triangulation logic.

In an example where location protocol 210 includes trilateration logic, processor 110 may determine a location of device 130 based on a distance between device 130 and each respective antenna receiving identification 152. For example, processor 110 may use signal strength values 155 to determine distances $R_{174}$, $R_{176}$, and $R_{178}$ between device 130 and antennas 174, 176, 178. Processor 110 may determine a respective circular area surrounding antennas 174, 176, 178 with respective radius of $R_{174}$, $R_{176}$, and $R_{178}$. Processor 110 may determine a location of device 130 by identifying an intersection between the circular areas formed by radii $R_{174}$, $R_{176}$, and $R_{178}$. Processor 110 may determine a location of device 230 using similar trilateration logic.

In an example where location protocol 210 includes multilateration logic, processor 110 may determine a location of device 130 based on distances between device 130 and each respective antenna receiving identification 152. For example, identification 152 may be received at antennas 170, 172, 174, 176, 178 inside of structure 106. Processor 110 may use signal strength values 155 and known locations of antennas 170, 172, 174, 176, 178 to determine a location of device 130. Processor 110 may determine a location of device 230 using similar multilateration logic.

Device table 212 may include historical data that corresponds to a historical location of device 130 and/or device 230. Processor 110 may store locations of device 130 and/or device 230 in device table 212. Processor 110 may modify historical data in device table 212 based on locations of device 130 and/or device 230. Map 214 may be a map that includes locations of one or more facilities inside structure 106. Map 214 may further include locations of antennas 170, 172, 174, 176, 178 inside structure 106. Content table 216 may include data that corresponds to one or more facilities inside structure 106. For example, content table 216 may include content, media, links, promotions, events and/or advertisements corresponding to one or more facilities inside structure 106.

In an example, a visitor 202 using device 230 may bring device 230 inside of structure 106. Base station 120 may broadcast request 150 through antennas 170, 172, 174, 176, 178. Device 230 may receive request 150. Device 230 may broadcast identification 252 to base station 120 in response to receiving request 150. Antennas 170, 172, 174 may each receive identification 252 at an associated signal strength. Base station 120 may receive identification 252 from each antenna 170, 172, 174 and may determine associated signal strengths.

Visitor 202 may activate application 140 on device 230. Base station 120 may determine signal strength values associated with identification 252. Base station 120 may generate identification data 253 that includes identification 252 and one or more signal strength values 255. Base station 120 may send identification data 253 to processor 110. Processor 110 may search for identification 252 in device table 212 and may determine that there is no historical data relating to device 230. Processor 110 may determine a location of device 230 based on a combination of signal strength values associated with identification data 252 and may store the location of device 230 in device table 212. In response to an absence of the identification, processor 110 may generate and store in device table 212, historical locations that corresponds to locations of device 230 in structure 106. Processor 110 may identify location based content 280 in memory 112 based on location of device 230, and analysis of data in device table 212, data in map 214, and/or data in content table 216. Processor 110 may send location based content 280 to device 230 through base station 120 and/or antennas 170, 172, 174, 176, 178. Visitor 202 may view location based content 280 using device 230.

Figure 3:
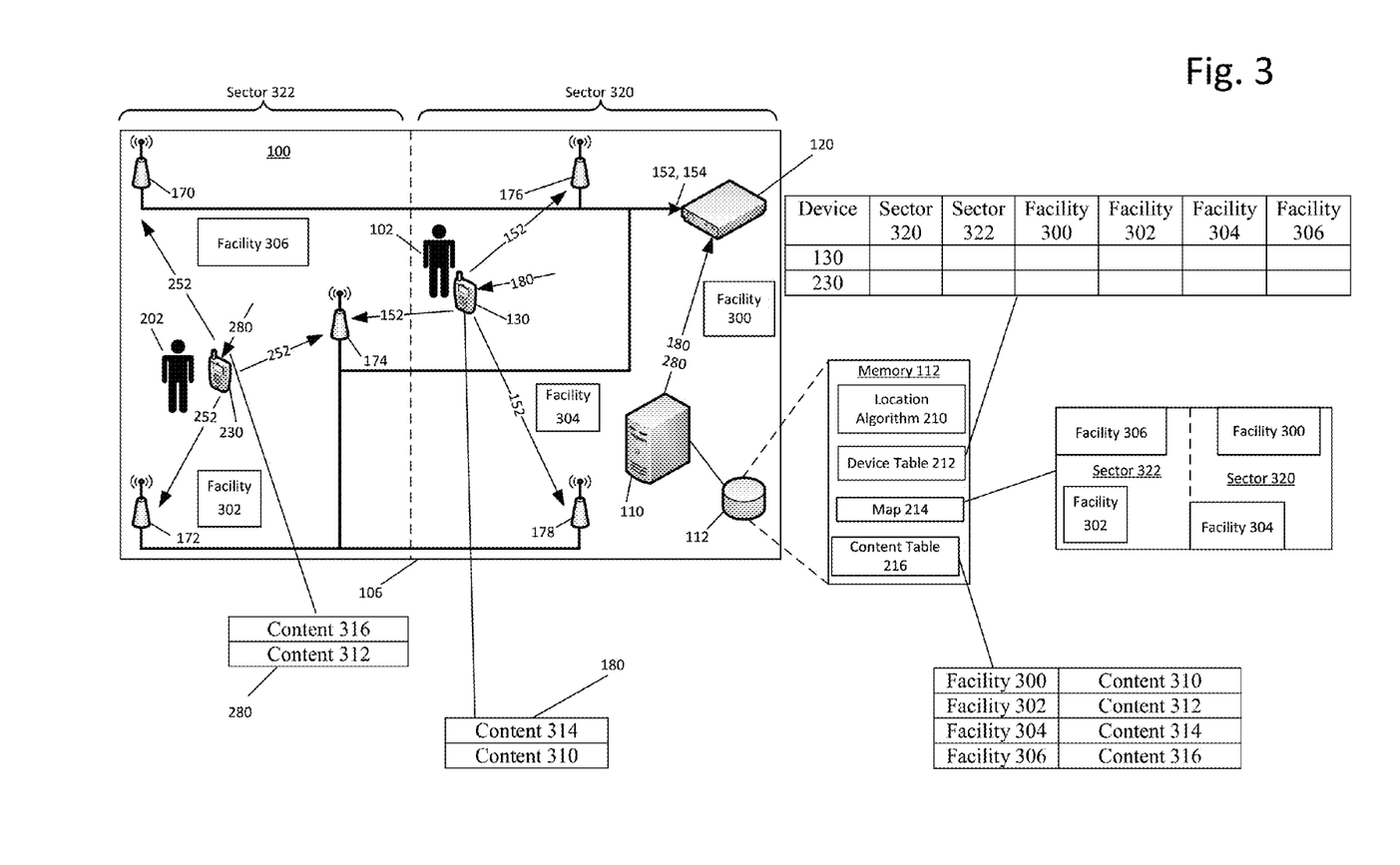
FIG. 3 illustrates the example system of FIG. 1 with additional detail relating to determining relevant location based to be sent to a communication device in a structure.

FIG. 3 illustrates system 100 of FIG. 1 with additional detail relating to determining relevant content to be sent to a communication device in a structure, arranged in accordance with at least some embodiments described here. FIG. 3 is substantially similar to FIG. 1 and FIG. 2, with additional details. Those components in FIG. 3 that are labeled identically to components of FIG. 1 and FIG. 2 will not be described again for the purposes of clarity.

In an example, structure 106 may include facilities 300, 302, 304, 306 and/or one or more sectors 320, 322. Map 214 includes locations of facilities 300, 302, 304, 306 and sectors 320, 322 inside structure 106. Referring to the example in FIG. 3, facilities 300 and 304 may be inside sector 320, and facilities 302 and 306 may be inside sector 322. Device table 212 may include data corresponding to historical locations of device 130 and/or device 230 in facilities 300, 302, 304, 306. For example, device table 212 may include an indication of an amount of time, or percentage of overall time, where device 130 was inside a respective facility 300, 302, 304, 306. Content table 216 may include contents 310, 312, 314, 316, where contents 310, 312, 314, 316 may relate to facilities 300, 302, 304, 306, respectively. In some examples, contents 310, 312, 314, 316 may be coupons and/or information regarding promotional events relating to facilities 300, 302, 304, 306.

In an example, processor 110 may determine that device 130 is inside sector 320. Processor 110 may store the location of device 130 in device table 212 as a historical location. Processor 110 may analyze map 214 and may identify that facilities 300, 304 are inside sector 320. Processor 110 may identify location based content 180 in memory 112 in response to identification of facilities 300, 304. Identification of location based content 180 may include identification of contents 310, 314 in content table 216. Processor 110 may compile content 310, 314 such as by filtering and sorting relevant data to produce location based content 180. Processor 110 may sort contents 310, 314 in location based content 180 based on analysis of historical locations of device 130 in device table 212. Memory 112 may also store historical purchase data such as what the device owner bought and when. For example, device table 212 shows that device 130 visited facility 304 more than facility 300. Processor 110 may include content 314 associated with facility 304 in a first row of location based content 180, and may include content 310 associated with facility 300 in a second row of location based content 180.

In some examples, device table 212 may include data corresponding to a duration in which device 130 was in sectors 322, 320 or facilities 300, 302, 304, 306. As discussed below, processor 110 may sort contents 310, 314 in location based content 180 based on a duration in which device 130 was in facilities 300, 304. In some examples, device table 212 may include data corresponding to one or more particular items associated with a profile of device 130. For example, a profile of device 130 may be associated with computer accessories. Processor 110 may sort contents in location based content 180 based on the associated item, such as including content relating to a facility that includes computer accessories, in a first row of location based content 180. Processor 110 may send location based content 180 to base station 120.

In an example, processor 110 may determine device 230 is inside sector 322. Processor 110 may store the location of device 230 in device table 212. Processor 110 may analyze map 214 and may identify facilities 302, 306 are inside sector 322. Processor 110 may identify location based content 280 in memory 112 based on the identification of facilities 302, 306. Identification of location based content 280 may include identification of contents 312, 316 in content table 216. Processor 110 may sort contents 312, 316 in location based content 280 based on methods such as indexing or based on location of facilities in structure 106. For example, device table 212 may illustrate that device 230 was not in facilities 300, 302, 304, 306. In response to an absence of device 230 in device table 212, processor 110 may determine device 230 is a new device to visit structure 106 and may sort contents 312, 316 by indexing. In another example, processor 110 may determine that facility 302 is closer to device 230 than facility 306 and sort content 312, 316 accordingly.

In some examples, device 130 and/or device 230 may be configured to receive text messages. Processor 110 may identify location based content 180, 280 in memory 112 and may generate a message, such as a text message, including location based content 180, 280. In some examples, device 130 and/or device 230 may be configured to receive files in video format. Processor 110 may generate a video including location based content 180, 280.

Among other possible benefits, a system in accordance with the disclosure may benefit personnel and/or customers of a structure such as a shopping mall. For example, owners of the shopping mall and/or shops inside the shopping mall may attract more customers by providing a convenience of receiving coupons and/or offers from shops inside the shopping mall. Owners of the shopping mall may detect a location of a visitor inside the mall at a time desired by the owner of the shopping mall and need not require waiting for the visitor to send a signal from a mobile device.

A system in accordance with the disclosure may allow a shopping mall owner and/or shop owners to establish direct contact with visitors instead of waiting for visitors to contact the shopping mall and/or shops. Visitors who visit the shopping mall and/or shops may benefit from an ease of receiving coupons and/or offers from shops by activating an application on a device such as a cellular phone. Furthermore, by using the system in accordance with the disclosure, visitors do not need to browse a store directory to retrieve particular coupons and/or offers nor generate a request to the shopping mall and/or shops to inquire about promotions and/or events.

Figure 4:
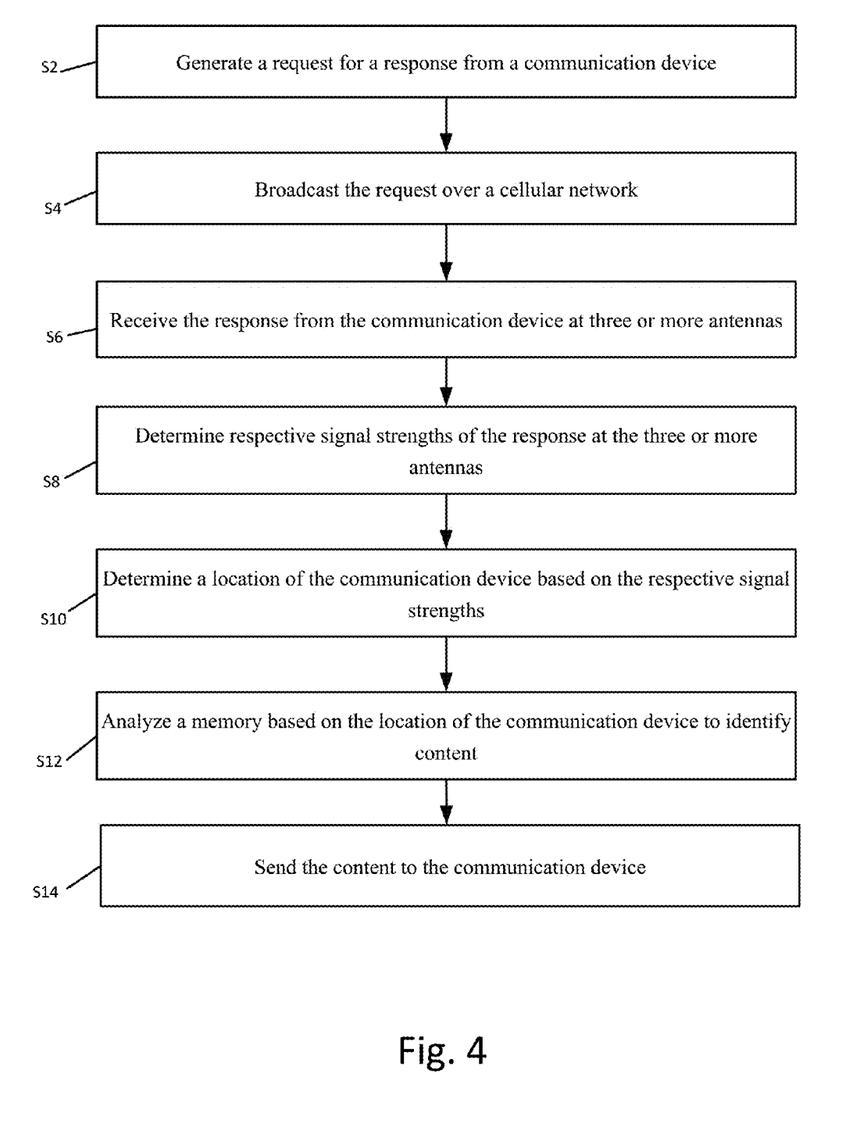
FIG. 4 illustrates a flow diagram of an example process for implementing determination of a location of a communication device.

FIG. 4 illustrates a flow diagram of an example process for implementing determination of a location of a communication device in a structure, arranged in accordance with at least some embodiments presented herein. The process in FIG. 4 could be implemented using, for example, system 100 discussed above. An example process may include one or more operations, actions, or functions as illustrated by one or more of blocks S2, S4, S6, S8, S10, S12 and/or S14. Although illustrated as discrete blocks, various blocks may be divided into additional blocks, combined into fewer blocks, or eliminated, depending on the desired implementation.

Processing may begin at block S2, "Generate a request for a response from a communication device." A processor may generate a request for a response from a communication device such as an identification of the communication device. The processor may be effective to convey communication packets between the device and a cellular network. In an example, the communication device may in inside of a structure and the processor may be effective to convey communication packets between the communication device and a cellular network that is outside of the structure.

Processing may continue from block S2 to block S4, "Broadcast the request over a cellular network." The processor may broadcast the request over a cellular network through an antenna. The antenna may be located inside of the structure.

Processing may continue from block S4 to block S6, "Receive the response from the communication device at three or more antennas." The base station may receive the response from the communication device at three or more antennas.

Processing may continue from block S6 to block S8, "Determine respective signal strengths of the response at the three or more antennas." The processor may analyze the response and determine respective signals strengths of the response at the three or more antennas.

Processing may continue from block S8 to block S10, "Determine a location of the communication device based on the respective signal strengths." The processor may determine a location of the communication device based on the respective signal strengths. In some examples, the processor may determine the location of the device based on the signal strength such as by using triangulation, trilateration, and/or multilateration methods. In examples where the response includes an identification of the communication device, the processor may search for the identification in a memory configured to be in communication with the processor. In response to finding the identification in the memory, the processor may update historical data relating to the device. The historical data may correspond to historical locations of the device inside of the structure. In response to an absence of the identification in the memory, the processor may generate historical data relating to the communication device.

Processing may continue from block S8 to block S10, "Analyze a memory based on the location of the communication device to identify content." The processor may analyze the memory based on the location of the communication device to identify content. The processor may analyze historical data relating to the communication device. The processor may further analyze a map of the structure. The map may include locations of one or more facilities that may be inside of the structure. The processor may further identify particular facilities based on the location of the communication device and the analysis of the map. The processor may further identify the content based on the particular facilities.

Processing may continue from block S12 to block S14, "Send the content to the communication device." The processor may send the content to the communication device.

Figure 5:
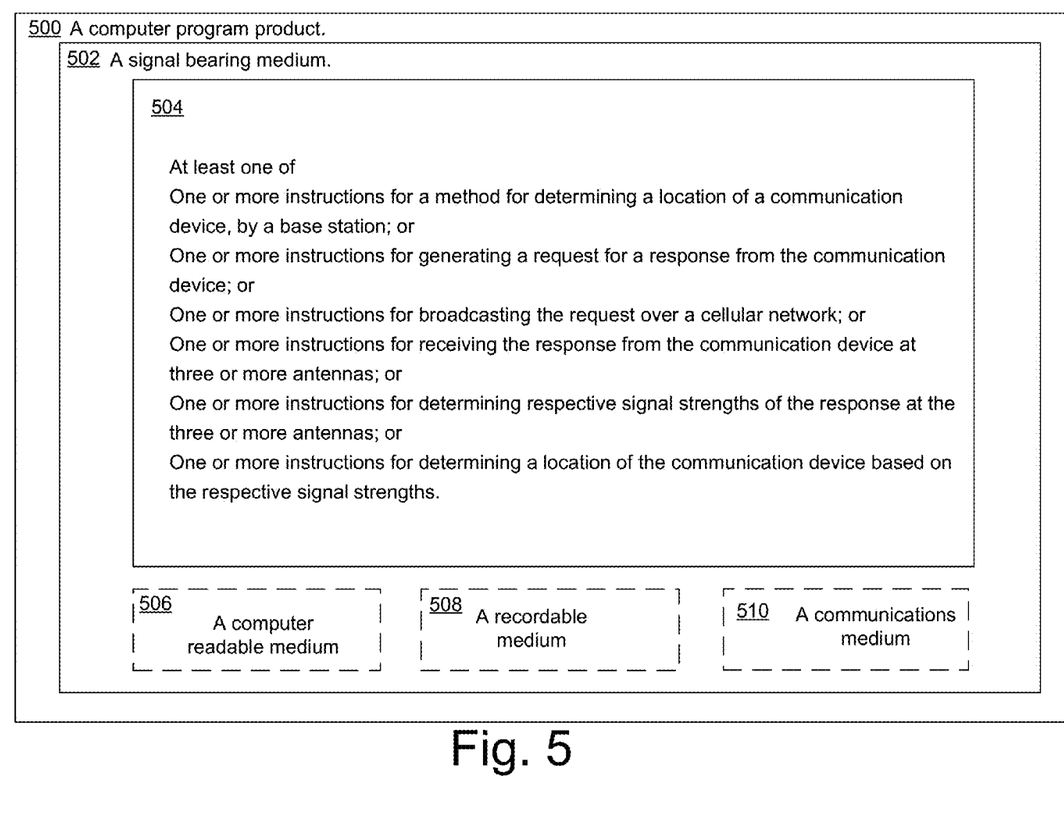
FIG. 5 illustrates an example computer program product that can be utilized to implement determination of a location of a communication device.

FIG. 5 illustrates an example computer program product 500 that can be utilized to implement determination of a location of a communication device, arranged in accordance with at least some embodiments described herein. Computer program product 500 may include a signal bearing medium 502. Signal bearing medium 502 may include one or more instructions 504 that, when executed by, for example, a processor, may provide the functionality described above with respect to FIGS. 1-4. Thus, for example, referring to system 100, processor 110 may undertake one or more of the blocks shown in FIG. 5 in response to instructions 504 conveyed to the system 100 by signal bearing medium 502.

In some implementations, signal bearing medium 502 may encompass a computer readable medium 506, such as, but not limited to, a hard disk drive (HDD), a Compact Disc (CD), a Digital Video Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communication link, a wireless communication link, etc.). Thus, for example, computer program product 500 may be conveyed to one or more modules of the system 100 by an RF signal bearing medium 502, where the signal bearing medium 502 is conveyed by a wireless communications medium 510 (e.g., a wireless communications medium conforming with the IEEE 802.11 standard).

Figure 6:
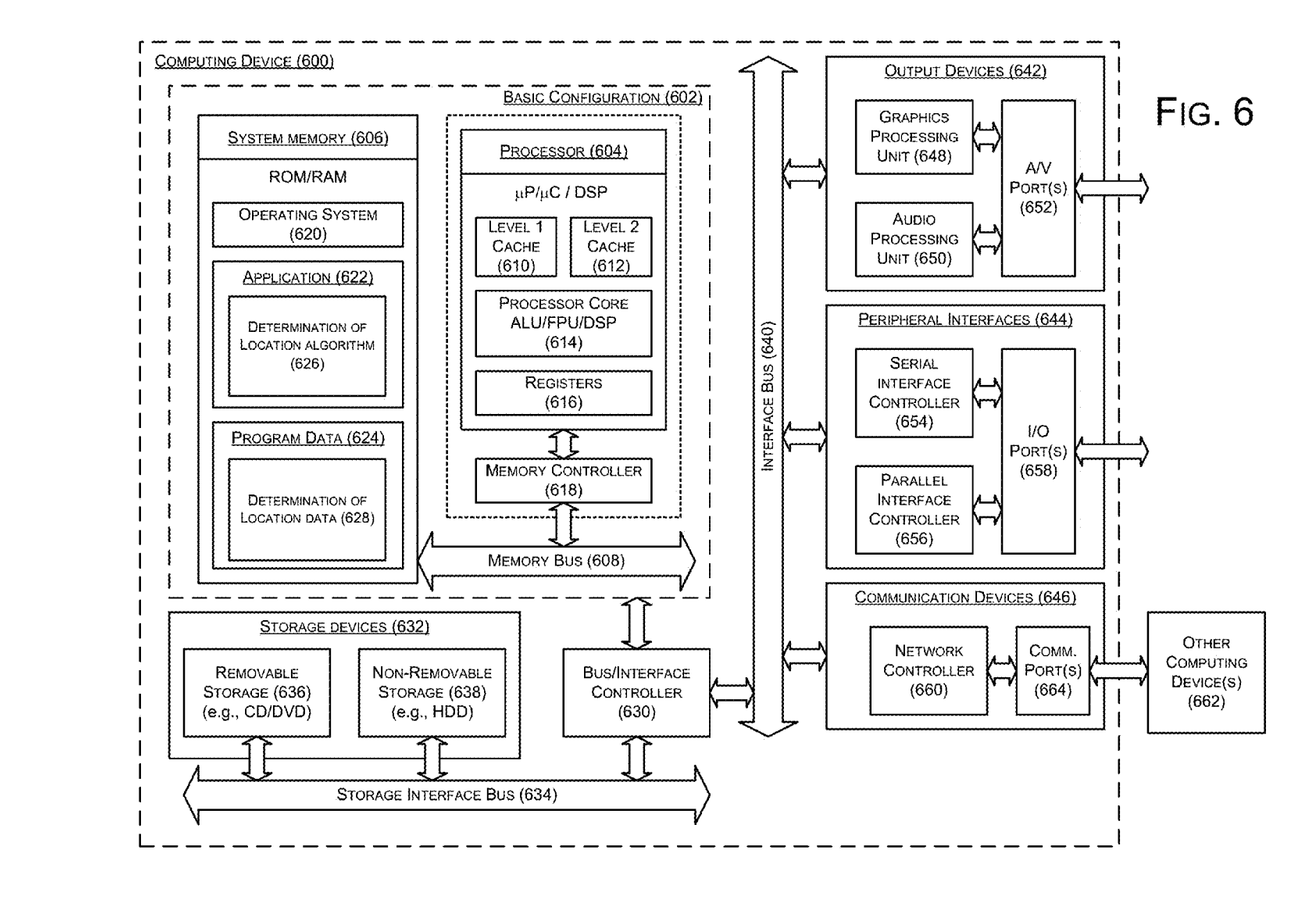
FIG. 6 is a block diagram illustrating an example computing device that is arranged to implement determination of a location of a communication device.

FIG. 6 is a block diagram illustrating an example computing device 600 that is arranged to implement determination of a location of a communication device, arranged in accordance with at least some embodiments described herein. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a determination of a location algorithm 626 that is arranged to perform the functions as described herein including those described with respect to system 100 of FIGS. 1-5. Program 624 may include determination of a location data 628 that may be useful to implement determination of a location of a communication device as is described herein. In some embodiments, application 622 may be arranged to operate with program data 624 on operating system 620 such that determination of a location of a communication device may be provided. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to determine a location of a communication device, the method comprising, by a base station:
generating a request for a response from the communication device;
broadcasting the request over a cellular network;
receiving the response as a first received response from the communication device at a first antenna;
determining a first signal strength of the first received response;
receiving the response as a second received response from the communication device at a second antenna;
determining a second signal strength of the second received response;
receiving the response as a third received response from the communication device at a third antenna;
determining a third signal strength of the third received response;
determining the location of the communication device based on the first signal strength, the second signal strength, and the third signal strength;
analyzing a memory based on the location of the communication device to identify content; and
sending the content to the communication device.

2. The method of claim 1, wherein the base station is effective to convey communication packets between the communication device and the cellular network.

3. The method of claim 1, wherein each of the first received response, the second received response, and the third received response includes an identification of the communication device, wherein the identification includes international mobile subscriber identity of the communication device.

4. The method of claim 3, further comprising:
analyzing historical data that relates to the communication device, wherein the historical data corresponds to historical locations of the communication device inside a structure;
analyzing a map of the structure, wherein the map includes locations of one or more facilities inside the structure;
identifying particular facilities from the one or more facilities based on the location of the communication device and analysis of the map;
identifying the content based on the particular facilities; and
sending the content to the communication device.

5. The method of claim 4, wherein prior to analyzing the historical data, the method further comprises:
searching for the identification of the communication device in the memory; and
upon finding the identification of the communication device in the memory, updating the historical data based on the location of the communication device.

6. The method of claim 4, wherein prior to analyzing the historical data, the method further comprises:
searching for the identification of the communication device in the memory; and
upon determining an absence of the identification of the communication device in the memory, generating the historical data related to the communication device.

7. The method of claim 1, wherein:
the communication device is a first communication device,
each of the first received response, the second received response, and the third received response includes a first identification of the first communication device,
the request is a request for the first identification of the first communication device and for a second identification of a second communication device, and
the content is first content;
the method further comprising:
analyzing the memory to identify the first content, wherein the first content corresponds to historical locations of the first communication device inside a structure;
receiving the second identification from the second communication device;
determining a fourth signal strength associated with the second identification;
determining a location of the second communication device inside the structure based on the fourth signal strength;
analyzing the memory based on the location of the second communication device inside the structure to identify second content, wherein the second content corresponds to historical locations of the second communication device inside the structure; and
sending the first content to the first communication device and sending the second content to the second communication device, wherein the first content and the second content are different from each other.

8. A base station configured to determine a location of a communication device, the base station comprising:
a processor; and
a memory configured to be in communication with the processor,
the processor is effective to:
generate a request for a response from the communication device;
broadcast the request over a cellular network;
receive the response as a first received response from the communication device at a first antenna;
determine a first signal strength of the first received response;
receive the response as a second received response from the communication device at a second antenna;
determine a second signal strength of the second received response;
receive the response as a third received response from the communication device at a third antenna;
determine a third signal strength of the third received response;
determine the location of the communication device based on the first signal strength, the second signal strength, and the third signal strength;
analyze the memory based on the location of the communication device to identify content; and
send the content to the communication device.

9. The base station of claim 8, wherein the processor is further effective to convey communication packets between the communication device and the cellular network.

10. The base station of claim 9, wherein each of the first received response, the second received response, and the third received response includes an identification of the communication device.

11. The base station of claim 8, wherein the processor is further effective to:

analyze historical data stored in the memory, wherein the historical data corresponds to historical locations of the communication device inside a structure;
analyze a map of the structure stored in the memory, wherein the map includes locations of one or more facilities inside the structure;
identify particular facilities from the one or more facilities in the memory based on the location of the communication device and analysis of the map;
identify the content based on the particular facilities; and
send the content to the communication device.

12. The base station of claim 11, wherein each of the first received response, the second received response, and the third received response includes an identification of the communication device and the processor is further effective to:
search for the identification of the communication device in the memory; and
in response to the identification of the communication device being found in the memory, update the historical data based on the location of the communication device.

13. The base station of claim 11, wherein each of the first received response, the second received response, and the third received response includes an identification of the communication device and the processor is further effective to:
search for the identification of the communication device in the memory; and
in response to the identification of the communication device not being found in the memory, generate the historical data related to the communication device.

14. A system effective to determine a location of a communication device, the system comprising:
a processor;
a first antenna inside of a structure, wherein the first antenna is configured to be in communication with the processor;
a second antenna inside of the structure, wherein the second antenna is configured to be in communication with the processor;
a third antenna inside of the structure, wherein the third antenna is configured to be in communication with the processor; and
a memory configured to be in communication with the processor,
the processor is effective to:
generate a request for a response from the communication device;
broadcast the request for an identification of the communication device over a cellular network;
receive the response as a first received response from the communication device at the first antenna;
determine a first signal strength of the first received response;
receive the response as a second received response from the communication device at the second antenna;
determine a second signal strength of the second received response;
receive the response as a third received response from the communication device at the third antenna;
determine a third signal strength of the third received response;
determine the location of the communication device inside of the structure based on the first signal strength, the second signal strength, and the third signal strength;
analyze the memory based on the location of the communication device to identify content; and
send the content to the communication device.

15. The system of claim 14, wherein the processor is further effective to:
analyze historical data stored in the memory, wherein the historical data corresponds to historical locations of the device inside of the structure;
analyze a map of the structure stored in the memory, wherein the map includes locations of one or more facilities in the structure;
identify particular facilities from the one or more facilities based on the location of the communication device and analysis of the map;
identify the content based on the particular facilities; and
send the content to the communication device.

16. The system of claim 14, wherein each of the first received response, the second received response, and the third received response includes the identification of the communication device and the processor is further effective to:
search for the identification of the communication device in the memory; and
in response to the identification of the communication device being found in the memory, update the historical data based on the location of the communication device.

17. The system of claim 14, wherein each of the first received response, the second received response, and the third received response includes the identification of the communication device and the processor is further effective to:
search for the identification of the communication device in the memory; and
in response to the identification of the communication device not being found in the memory, generate the historical data related to the communication device.

18. The system of claim 14, further comprising a base station configured to be in communication with the processor, the first antenna, the second antenna, and the third antenna, the base station effective to convey communication packets between the communication device and the cellular network when the communication device is inside the structure.

* * * * *

UNITED STATES PATENT AND TRADEMARK OFFICE
CERTIFICATE OF CORRECTION

PATENT NO. : 9,743,250 B2
APPLICATION NO. : 14/343653
DATED : August 22, 2017
INVENTOR(S) : Maytal It is certified that error appears in the above-identified patent and that said Letters Patent is hereby corrected as shown below:

In the Specification

In Column 1, Line 4, delete "CROSS REFERENCE" and insert -- CROSS-REFERENCE --, therefor.

In the Claims

In Column 15, Line 15, in Claim 12, delete "device and" and insert -- device, and --, therefor.

In Column 15, Line 26, in Claim 13, delete "device and" and insert -- device, and --, therefor.

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*